United States Patent
Bender et al.

[11] Patent Number: 5,708,078
[45] Date of Patent: Jan. 13, 1998

[54] MODIFIED NATURAL-RESIN ACID-ALDEHYDE ADDUCTS

[75] Inventors: Albert Bender, Mainz; Astrid Giencke, Hofheim, both of Germany

[73] Assignee: Vianova Resins GmbH, Mainz-Kastel, Germany

[21] Appl. No.: 731,271

[22] Filed: Oct. 11, 1996

[30] Foreign Application Priority Data

Oct. 13, 1995 [DE] Germany ............ 195 38 161.0

[51] Int. Cl.[6] .............. C09D 11/10; C09D 11/08; C08G 8/34
[52] U.S. Cl. .............. 525/54.42; 525/54.44; 528/40; 106/20 R; 106/30 R; 106/218; 106/219; 106/228; 106/241; 106/500
[58] Field of Search .............. 106/20 R, 30 R, 106/218, 219, 228, 241, 500; 528/40; 525/54.42, 54.44

[56] References Cited

U.S. PATENT DOCUMENTS

| | | | |
|---|---|---|---|
| 2,572,071 | 10/1951 | St. Clair et al. | 260/105 |
| 3,674,732 | 7/1972 | Pitzalis et al. | 260/25 |
| 3,935,145 | 1/1976 | Rudolphy | 260/28.5 |
| 4,198,329 | 4/1980 | Rudolphy et al. | 206/24 |
| 5,380,800 | 1/1995 | Bender et al. | 525/133.5 |
| 5,427,612 | 6/1995 | Bender | 106/30 |
| 5,498,684 | 3/1996 | Bender | 528/40 |
| 5,556,454 | 9/1996 | Bender | 106/218 |

FOREIGN PATENT DOCUMENTS 0 641 811 3/1995 European Pat. Off.
0 679 667 11/1995 European Pat. Off.

*Primary Examiner*—Frederick Krass
*Attorney, Agent, or Firm*—Foley & Lardner

[57] ABSTRACT

Modified natural-resin acid esters comprising units of compounds of each of the groups A) natural resins and natural-resin acids, B) aldehydes and aldehyde acetals, C) alcohols having at least two hydroxyl groups, D) metal salts and, if desired, of compounds of one or more of the groups E) α,β-ethylenically unsaturated carboxylic acids and their anhydrides, F) fatty acids and fatty acid esters, G) ethylenically unsaturated hydrocarbon resins are suitable in pigment dispersions and pigment concentrates for printing inks. The natural-resin acid esters contain substantially no phenol or phenol-aldehyde condensation products.

15 Claims, No Drawings

MODIFIED NATURAL-RESIN ACID-ALDEHYDE ADDUCTS

BACKGROUND OF THE INVENTION

1. Field of the Invention

The present invention relates to modified natural-resin acid esters, to processes for their preparation by reacting natural-resin acids with aldehydes, polyols and metal salts, and to their use as binder resins in printing inks.

2. Description of Related Art

It is known to use phenolic-resin-modified natural-resin acid esters as binder resins in printing inks, especially for offset printing and the intaglio printing of illustrations with toluene. According to EP-A 0 666 294, modified natural-resin acid esters are prepared by reacting natural resins or natural-resin acids with $\alpha,\beta$-olefinically unsaturated carboxylic acids or their anhydrides, phenol-aldehyde condensation products, such as resols or novolaks, esterifying agents and, if desired, further modifying agents, such as fatty acids or hydrocarbon resins. In the course of the preparation of these phenolic-resin-modified natural-resin acid esters, salts of monovalent or else divalent metals are usually required as catalysts. In this context it is also known to prepare the phenolic resin "in situ" in the natural-resin melt comprising the phenol and the aldehyde.

The development of particularly high-speed printing machines and the trend of printing not only coated papers but, increasingly, uncoated papers of increased absorbency as well, leads to particularly high requirements on the quality of these binder resins. In particular, they must give the ink film a good holdout on the printing material. In no case should binder resins together with pigments fuse into the interior, since this is associated with a loss in gloss and reduced abrasion resistance. However, the known binder resins it is not always possible to meet the increased requirements with satisfaction, and maximum gloss is extremely important for an attractive print.

SUMMARY OF THE INVENTION

One object of the present invention is to provide binder resins which insure maximum gloss of the ink film on the printed material even at a relatively high processing speed.

Still another objective is to provide a novel modified natural-resin acid esters. Yet another objective is to provide a process for the production of the modified natural-resin acid esters. Still another objective is to provide a pigment dispersion, pigment concentrate or printing ink which includes the modified natural-resin binder.

In accomplishing the foregoing objectives, there has been provided a modified natural-resin acid ester comprising one or more units of compounds of each of the groups:

A) natural resins and natural-resin acids;
B) aldehydes and aldehyde acetals;
C) alcohols having at least two hydroxyl groups;
D) metal salts, and
optionally one or more units of compounds of one or more of the groups:
E) $\alpha,\beta$-ethylenically unsaturated carboxylic acids and their anhydrides;
F) fatty acids and fatty acid esters; and
G) ethylenically unsaturated hydrocarbon resins,
wherein the modified natural-resin ester contains substantially no phenol or phenol-aldehyde condensation products.

In another embodiment, there has been provided a modified natural-resin acid ester consisting of one or more units of compounds of each of the groups A) natural resins and natural-resin acids,
B) aldehydes and aldehyde acetals,
C) alcohols having at least two hydroxyl groups,
D) metal salts, and
optionally, one or more units of compounds of one or more of the following groups
E) $\alpha,\beta$-ethylenically unsaturated carboxylic acids and their anhydrides,
F) fatty acids and fatty acid esters, and
G) ethylenically unsaturated hydrocarbon resins.

According to another aspect of the present invention, there has been provided a process for producing modified natural-resin acid esters which comprises:

(i) reacting one or more units of:
  A) natural resins and natural-resin acids and
  B) aldehydes and aldehyde acetals; and
(ii) subsequently reacting the product obtained in (i) with one or more units of:
  C) alcohols having at least two hydroxyl groups,
  D) metal salts, and
  optionally one or more units of compounds of one or more of the groups
  E) $\alpha,\beta$-ethylenically unsaturated carboxylic acids and their anhydrides,
  F) fatty acids and fatty acid esters, and
  G) ethylenically unsaturated hydrocarbon resins, at a temperature of from 100° to 300° C. with the elimination of water.

According to still another aspect of the present invention, there has been provided a pigment dispersion or concentrate which includes the modified natural-resin acid ester. According to yet another aspect of the present invention, there has been provided a printing ink which comprises the modified natural-resin acid ester. According to still another aspect of the present invention, there has been provided a printing ink for use in intaglio printing of illustrations which comprises the modified natural-resin acid ester and toluene.

Further objects, features and advantages of the present invention will become apparent to those skilled in the art from the detailed of preferred embodiments which follows.

DETAILED DESCRIPTION OF PREFERRED EMBODIMENTS

One aspect of the present invention lies in avoiding the use of phenols and phenol-aldehyde condensation products in the preparation of modified natural-resin acid esters, and reacting aldehyde with the natural resin or the natural-resin acid, and then reacting the resulting natural resin aldehyde or natural-resin acid-aldehyde adducts with polyols and metal compounds, and, if desired, carrying out further modification using only $\alpha,\beta$-olefinically unsaturated carboxylic acids or their anhydrides, fatty acids or hydrocarbon resins.

The invention therefore provides modified natural-resin acid esters consisting of units of compounds of each of the groups A) natural resins and natural-resin acids,
B) aldehydes and aldehyde acetals,
C) alcohols having at least two hydroxyl groups, and
D) metal salts.

If desired, compounds of one or more of the following groups can also be included:

E) α,β-ethylenically unsaturated carboxylic acids and their anhydrides,

F) fatty acids and fatty acid esters, and

G) ethylenically unsaturated hydrocarbon resins.

Another embodiment provides modified natural-resin acid esters which comprises one or more units of compounds of each of the groups:

A) natural resins and natural-resins acids;

B) aldehydes and aldehyde acetals;

C) alcohols having at least two hydroxyl groups;

D) metal salts, and optionally one or more units of compounds of one or more of the following groups:

E) α,β-ethylenically unsaturated carboxylic acids and their anhydrides;

F) fatty acids and fatty acid esters; and

G) ethylenically unsaturated hydrocarbon resins, wherein the modified natural-resin ester contains substantially no phenol or phenol-aldehyde condensation products. "Substantially no phenol or phenol-aldehyde condensation products" is defined as less the 0.1 wt % of the phenol or phenol-aldehyde condensation products present in the modified natural-resin ester based on the total dry weight of the resin ester. Preferably, the modified natural-resin ester contains no phenol or phenol-aldehyde condensation products.

Compounds of groups A) to G) which are preferably used are:

A) rosin, root resin, tall resin and disproportionated or partially hydrogenated or dimerized natural resin of any origin, where the natural resins or natural-resin acids may also contain minor amounts of other terpenes, B) aliphatic ($C_1$–$C_7$) aldehydes, especially formaldehyde in its various monomeric, oligomeric and polymeric forms, acetaldehyde, butyraldehyde, isobutyraldehyde, and also benzaldehyde, furfural and glyoxal, where the aldehydes can also be used in the form of their acetals, C) bifunctional alcohols, for example, glycols, or trifunctional alcohols, for example, trimethylolethane, trimethylolpropane, glycerol, or tetrafunctional alcohols, for example, pentaerythritol, or pentafunctional alcohols, for example, dimerized trimethylolpropane, or hexafunctional alcohols, for example, dimerized pentaerythritol, and sorbitol, D) salts of lithium, sodium, potassium, magnesium, calcium, zinc and aluminum, preferably oxides, hydroxides, carbonates, hydrogen carbonates, acetates and alcoholates, more preferably salts of zinc, magnesium and calcium, E) α,β-ethylenically unsaturated carboxylic acids or their anhydrides, especially fumaric acid, maleic acid, maleic anhydride, itaconic acid, cinnamic acid, acrylic acid, and methacrylic acid, F) animal or vegetable fatty acids or fatty acids obtained by refining, and fatty acid esters, especially fatty acid glycerol esters in the form of vegetable or animal oils, for example, tall oil, cottonseed oil, soya oil, linseed oil, tung oil, fish oil, coconut oil, hydrogenated coconut oil, dimerized and trimerized fatty acids, G) polymers or oligomers of mono- and/or polyethylenically unsaturated ($C_5$–$C_9$) hydrocarbons, in particular, from the group consisting of isoprene, cyclopentadiene, indene, coumarone and styrene, or copolymers of ethylenically unsaturated hydrocarbon resins with natural resins or natural-resin acids.

The present invention additionally provides a process for the preparation of the modified natural-resin acid esters by first preparing beforehand, a product from the reaction of compounds of group A) with compounds of group B). The product prepared beforehand is then reacted with compounds of group C) and compounds of group D) and, if desired, with compounds of one or more of groups E), F) and G) in the temperature range from 100° to 300° C. with elimination of water.

In one embodiment, the mass fraction of the individual components, based on the overall mass of components employed (=100% by weight) is preferably from 30 to 95% by weight, in particular from 40 to 90% by weight, of natural resins or natural-resin acids from group A), from 1 to 20% by weight, in particular from 3 to 10% by weight, of aldehydes or aldehyde acetals from group B), from 0.1 to 20% by weight, in particular from 3 to 15% by weight, of polyols from group C), from 0.1 to 10% by weight, calculated as oxide, of metal salts from group D), from 0 to 20% by weight, in particular from 2 to 10% by weight, of α,β-ethylenically unsaturated carboxylic acids or their anhydrides from group E), from 0 to 40% by weight, in particular from 1 to 10% by weight, of fatty acids or fatty acid esters from group F), and from 0 to 70% by weight, in particular from 1 to 25% by weight, of hydrocarbon resins from group G).

Preparation of the modified natural-resin esters is carried out using the apparatus customary in the chemistry of natural resins. In this apparatus the novel products of the present invention can be prepared by discontinuous or continuous techniques.

First of all, a natural resin- or natural-resin acid-aldehyde adduct is prepared in accordance with known methods known to those skilled in the art, by reacting the natural resin or the natural-resin acid with the aldehyde or aldehyde acetal. In accordance with DE-C 27 55 825, incorporated herein by reference in its entirety, this product can be prepared by reacting components A) and B) in solvents, for example, toluene or alcohol, in the presence or absence of catalysts, for example, hydrogen chloride. Preferably the reaction occurs in the melt in a temperature range from 100° to 200° C., working if desired, under a pressure of preferably from 1 to 10 bar.

It is preferably possible in this process to add up to two moles of aldehyde per mole of natural-resin acid used. However, it is also possible to add less than one mole of aldehyde per mole of natural resin or natural-resin acid, so that the batches contain excess natural resin. The excess resin is able to react, during the reaction according to the invention, with the other reactants. The ratio of the amounts of substance of aldehyde to the amount of substance of resin acid therefore is in the range between 2:1 and 0.5:1 mol/mol, preferably between 1.5:1 and 0.7:1 mol/mol, and particularly preferably between 1.2:1 and 0.8:1 mol/mol. In the preparation of the natural resin- or natural resin acid-aldehyde adducts, then, the weight ratio of natural resin or natural-resin acid to aldehyde is generally between 99.9:0.1 and 70:30, preferably between 98:2 and 75:25, and particularly preferably between 95:5 and 85:15.

In the following reaction step, the melted natural resin- or natural-resin acid-aldehyde adduct, which may also include unreacted natural resin, is preferably introduced as initial charge. Then, optionally, to modify the resin, it is possible to add fatty acids or ethylenically unsaturated hydrocarbon resins or α,β-olefinically unsaturated carboxylic acids or their anhydrides and to carry out the reaction at temperatures of preferably from 120° to 200° C. Subsequently, the polyol and the metal salts, or mixtures thereof, are added. The mixture is then heated with elimination of water at temperatures of preferably from 220° to 270° C.

However, it is also possible to add the reactants of groups C–G in modified order to the natural resin- or natural-resin acid-aldehyde adduct and at different temperatures without any substantial change in the properties of the product. For example, it is also possible to add the metal compound only when high reaction temperatures of 220° to 270° C. are reached. This is advantageous when the contents of metal compound are relatively high, in order to avoid excessive foaming of the mixtures, caused by formation of water. In this case, it is also advisable to add the metal compound not in solid form but as a suspension, for example, in xylene, and to add this suspension slowly.

If an $\alpha,\beta$-olefinically unsaturated carboxylic acid or its anhydride is used, it is preferable for the alcohol to be added to the reaction mixture only after the reaction of the $\alpha,\beta$-olefinically unsaturated carboxylic acid with the natural resin- or natural-resin acid-aldehyde adduct.

The progress of the reaction can expediently be monitored by determining the acid number. Thus the acid number of the resin mixture may initially and preferably be up to 200 mg of KOH/g of resin, determined in accordance with customary methods known to those skilled in the art. As the reaction progresses, with elimination of water, the acid number falls continuously. The esterification reaction is continued with distillation of water, which may also be carried out under azeotropic conditions using an inert entrainer, for example xylene, until the reaction according to the invention has reached the desired end stage. As soon as the acid number has fallen to values below preferably 50 mg of KOH/g of resin, it is possible in addition to determine the end point of the reaction, expediently by determining the viscosity values in a solvent, for example, toluene. If desired, volatile fractions, including the entrainer, are removed from the reaction product by distillation, under vacuum toward the end.

The novel binder resins are initially obtained as solids when the melt is cooled. However, the melt can also be converted into a varnish by adding solvent, for example toluene, mineral oil or petroleum fractions, with all forms between a solid and a liquid formulation being possible.

The viscosities are determined, for example, by measuring the 25% strength by weight solutions in toluene at 23° C. using a customary rotary viscometer. The viscosities are preferably in a range from 2 to 50 mPa.s., more preferably from 5 to 40 mPa.s, and most preferably from 7 to 35 mPa.s. When 50% strength by weight solutions in toluene are measured, the viscosities are preferably in a range from 20 to 2000 mPa.s. However, it is also possible to go above or below the stated ranges.

The molecular weight of the novel resins can be determined by gel permeation chromatography of the resin solutions in tetrahydrofuran (THF) using polystyrene foam in a permeation measuring instrument, in accordance with known methods. The mean molecular weight (weight-average $M_w$) of the novel resins in accordance with the measurement results obtained is preferably greater than 1000 g/mol and is subject to no critical upper limit. In a particularly preferred embodiment, however, the mean molecular weight $M_w$ is in a range from 1,500 to 50,000 g/mol, preferably from 2,000 to 40,000 g/mol, and particularly preferably from 3,000 to 30,000 g/mol.

Since, as is known, natural resins of various origin may differ in their composition—for example, they may have a different isomer distribution of the resin acids or different amounts of other terpenes—the same formulation may lead to different product properties, for example, in respect of viscosity. In this case, however, the formulation can be adapted to the respective natural resin by altering slightly the mass fractions of the components in the reactive mixture, if a specific viscosity value is required.

The novel resins can also be modified, during or preferably after the actual reaction, by adding further substances, as is conventional in the preparation of modified natural-resin acid esters. It is possible, for example, to add low molecular mass compounds, for example, rosin, rosin esters, vegetable oils and fatty acids, mineral oils, or polymers, such as phenolic resins, polyesters, alkyd resins, modified hydrocarbon resins, phenolic-resin-modified natural-resin acid esters, in order to optimize solution viscosities. However, the amounts are generally minor and should preferably be not more than 3% by weight, based on the total dry weight of the novel product.

Another aspect of the invention provides for the use of the novel resins as binder resins in pigment dispersions and pigment concentrates, and in printing inks, preferably for the intaglio printing of illustrations with toluene and for offset printing.

The novel resins show outstanding compatibility with other binders, for example, with prior art modified natural-resin acid esters, resinates, hydrocarbon resins or chlorinated rubber, which gives them broad applicability. Furthermore, they have an excellent wetting behavior for the pigments used in the intaglio printing of illustrations.

Moreover, the novel resins have the advantage over the phenolic-resin-modified natural-resin acid esters of the prior art of being substantially free and preferably completely free from phenol. Thus the novel binder resins of the invention possess a comparatively improved environmental compatibility. In addition, relative to the resinates described in DE-C 27 55 825, which are prepared by reacting natural-resin acid-formaldehyde adducts with basic calcium compounds, they have improved abrasion resistance.

The toluene-containing intaglio printing inks are formulated in accordance with the customary methods, by dissolving the appropriate binder resin in toluene and subjecting this varnish, in pigmented form, or a previously prepared pigment dispersion with toluene, to dilution. Additives which can be used are those which are otherwise customary, for example, fillers, such as calcium carbonate, or surfactants in order to improve pigment dispersion, such as lecithin, or waxes to improve abrasion resistance.

The invention additionally provides for the use of the novel resins as binder resins, preferably in printing inks for offset printing and letterpress printing, where—especially in gel form as gel varnishes—they can be employed with great advantages. The gel varnishes are preferably prepared by reacting binder resins with aluminum compounds, for example, aluminum alcoholate or aluminum alcoholate stabilized with acetoacetate, in high-boiling mineral oil in accordance with known procedures. The gel varnishes are mixed if desired with other binder resins, for example, phenolic-resin-modified rosins, vegetable oils, waxes, fillers, siccatives and further additives, and printing inks which can be used for offset and letterpress printing are obtained by pigmentation. The novel binder resins can also be used, after boiling with linseed oil, as overprint varnishes or gloss varnishes.

Owing to their good compatibility with aliphatic compounds, the novel modified resins of the invention can also be employed in combination with low-boiling petroleum fractions, as are used with petroleum spirit in the intaglio printing of illustrations. This broad applicability of the novel compounds for such different printing techniques as offset, letterpress and intaglio printing implies an extremely important advantage. The invention additionally provides, therefore, for the use of the novel resins as binder resins in printing inks for the intaglio printing of illustrations with petroleum spirit.

The invention is illustrated in more detail by the examples which follow, which do not, however, limit it. The parts and percentages indicated in the examples are by weight unless noted otherwise.

EXAMPLES

Example 1

Reaction of a Natural-Resin Acid-Formaldehyde Adduct with Pentaerythritol and Calcium Hydroxide 950 g of commercially available rosin, which is also referred to as natural resin or natural-resin acid, and 50 g of formaldehyde are heated at 160° C. for one hour under a pressure of 2.5 bar in a heatable 2 l autoclave with stirrer, thermometer, dropping funnel, distillation device and filling tube under a nitrogen atmosphere. The apparatus is then depressurized. Subsequently, 102 g of pentaerythritol are added and the mixture is heated up to 255° C. while distilling off water. Then a suspension of 42 g of calcium hydroxide in 100 g of xylene is added dropwise over the course of half an hour. As soon as the acid number has fallen below 40 mg of KOH/g of resin, evacuation is carried out at 100 mbar for 1 h in order to remove volatile fractions. After removing the vacuum with nitrogen, 972 g of a brittle, pulverizable resin are obtained with a softening point of 135° C. and an acid number of 35 mg of KOH/g of resin. A 50% strength solution in toluene has a viscosity at 23° C. of 225 mPa.s. By gel permeation chromatography a mean molecular weight $M_w$ of 2150 g/mol is determined. The reaction time for the preparation is 8 hours.

Example 2

Reaction of a Natural-Resin Acid-Formaldehyde Adduct with Pentaerythritol and Zinc Oxide The procedure of Example 1 is repeated with the modification that, instead of 42 g of calcium hydroxide, 46 g of zinc oxide are used. Yield: 981 g, m.p.: 138° C., acid number: 38 mg of KOH/g of resin, viscosity (50% strength in toluene): 38 mPa.s, $M_w$: 1550 g/mol.

Example 3

Reaction of a Natural-Resin Acid-Formaldehyde Adduct with Pentaerythritol and Magnesium Oxide The procedure of Example 1 is repeated with the modification that, instead of 42 g of calcium hydroxide, 26 g of magnesium oxide are used. Yield: 952 g, m.p.: 145° C., acid number: 42 mg of KOH/g of resin, viscosity (50% strength in toluene): 298 mPa.s, $M_w$: 2320 g/mol.

Example 4

Reaction of a Natural-Resin Acid-Formaldehyde Adduct with Maleic Anhydride, Pentaerythritol and Calcium Hydroxide 950 g of commercially available rosin, which is also referred to as natural resin or natural-resin acid, and 50 g of formaldehyde are heated at 160° C. for one hour under a pressure of 2.5 bar in a heatable 2 l autoclave with stirrer, thermometer, dropping funnel, distillation device and filling tube under a nitrogen atmosphere. The apparatus is then depressurized. Then 45 g of maleic anhydride are added to the reaction mixture and heating is carried out at 160° C. for 30 minutes more. Subsequently, 102 g of pentaerythritol are added and the mixture is heated up to 255° C. while distilling off water. Then a suspension of 42 g of calcium hydroxide in 100 g of xylene is added dropwise over the course of half an hour. As soon as the acid number has fallen below 40 mg of KOH/g of resin, evacuation is carried out at 100 mbar for 1 h in order to remove volatile fractions. After removing the vacuum with nitrogen, 1010 g of a brittle, pulverizable resin are obtained with a softening point of 135° C. and an acid number of 35 mg of KOH/g of resin. A 50% strength solution in toluene has a viscosity at 23° C. of 46 mPa.s. By gel permeation chromatography a mean molecular weight $M_w$ of 1600 g/mol is determined. The reaction time for the preparation is 8 hours.

Example 5

Reaction of a Natural-Resin Acid-Formaldehyde Adduct with Maleic Anhydride, Pentaerythritol and Zinc Oxide The procedure of Example 4 is repeated with the modification that, instead of calcium hydroxide, 46 g of zinc oxide are used. Yield: 1014 g, acid number: 27 mg of KOH/g of resin, m.p.: 137° C., viscosity of a 50% strength solution in toluene: 160 mPa.s, $M_w$: 1770 g/mol, reaction time: 8 hours.

Example 6

Reaction of a Natural-Resin Acid-Formaldehyde Adduct with Maleic Anhydride, Pentaerythritol and Magnesium Oxide The procedure of Example 4 is repeated with the modification that, instead of calcium hydroxide, 23 g of magnesium oxide are used. Yield: 995 g, acid number: 27 mg of KOH/g of resin, m.p.: 137° C., viscosity of a 50% strength solution in toluene: 160 mPa.s, $M_w$: 17,700 g/mol, reaction time: 8 hours.

Example 7

Reaction of a Natural-Resin Acid-Formaldehyde Adduct with Maleic Anhydride, Pentaerythritol, Magnesium Oxide and Hydrogenated Coconut Oil 950 g of commercially available rosin, which is also referred to as natural resin or natural-resin acid, and 50 g of formaldehyde are heated at 160° C. for one hour under a pressure of 2.5 bar in a heatable 2 l autoclave with stirrer, thermometer, dropping funnel, distillation device and filling tube under a nitrogen atmosphere. The apparatus is then depressurized. Then 50 g of maleic anhydride are added to the reaction mixture and heating is carried out at 160° C. for 30 minutes more. Subsequently, 146 g of pentaerythritol and 10 g of hydrogenated coconut oil are added and the mixture is heated up to 255° C. while distilling off water. Then 26 g of magnesium oxide are added to the mixture. As soon as the acid number has fallen below 35 mg of KOH/g of resin, evacuation is carried out at 100 mbar for 1 h in order to remove volatile fractions. After removing the vacuum with nitrogen, 1019 g of a brittle, pulverizable resin are obtained with a softening point of 135° C. and an acid number of 10 mg of KOH/g of resin. A 25% strength solution in toluene has a viscosity at 23° C. of 3 mPa.s and a 50% strength solution has a viscosity of 551 mPa.s. By gel permeation chromatography a mean molecular weight $M_w$ of 5354 g/mol is determined. The reaction time for the preparation is 8 hours.

Example 8

Reaction of a Natural-Resin Acid-Formaldehyde Adduct with Maleic Anhydride, Pentaerythritol, Calcium Hydroxide and a Hydrocarbon Resin 500 g of commercially available rosin, which is also referred to as natural resin or natural-resin acid, and 25 g of formaldehyde are heated at 160° C. for one hour under a pressure of 2.5 bar in a heatable 2 l autoclave with stirrer, thermometer, dropping funnel, distillation device and filling tube under a nitrogen atmosphere. The apparatus is then depressurized. 500 g of a hydrocarbon resin based on cyclopentadiene (iodine number: 171 g of iodine/100 g of resin) are then added and the mixture is stirred for half an hour more. Then 50 g of maleic anhydride are added to the reaction mixture and heating is carried out at 160° C. for 30 minutes more. Subsequently, 68 g of pentaerythritol are added and the mixture is heated up to 255° C. while distilling off water. Then 36 g of calcium hydroxide are added to the mixture. As soon as the acid number has fallen below 35 mg of KOH/g of resin, evacuation is carried out at 100 mbar for 1 h in order to remove volatile fractions. After removing the vacuum with nitrogen, 982 g of a brittle, pulverizable resin are obtained with a softening point of 138° C. and an acid number of 20 mg of KOH/g of resin. A 25% strength solution has a viscosity at 23° C. of 5 mPa.s and a 50% strength solution has a viscosity of 202 mPa.s. By gel permeation chromatography a mean molecular weight $M_w$ of 3481 g/mol is determined. The reaction time for the preparation is 8 hours.

Example 9

Reaction of a Natural-Resin Acid-Formaldehyde Adduct with Maleic Anhydride, Pentaerythritol, Calcium Hydroxide, Hydrogenated Coconut Oil and a Hydrocarbon Resin The procedure of Example 8 is repeated with the modification that 20 g of hydrogenated coconut oil are additionally added to the mixture. Yield: 1003 g, acid number: 27 mg of KOH/g of resin, m.p.: 132° C., viscosity of a 50% strength solution in toluene: 160 mPa.s, $M_w$: 2810 g/mol, reaction time: 8 hours.

Example 10

Reaction of a Natural-Resin Acid-Formaldehyde Adduct with Maleic Anhydride, Pentaerythritol and Lithium Hydroxide The procedure of Example 4 is repeated with the modification that the calcium hydroxide is replaced by 2 g of lithium hydroxide. Yield: 976 g, acid number: 27 mg of KOH/g of resin, m.p.: 125° C., viscosity of a 50% strength solution in toluene: 160 mPa.s, $M_w$: 18,110 g/mol, reaction time: 8 hours.

PERFORMANCE COMPARISON

Pigment concentrates for the intaglio printing of illustrations with toluene are prepared by customary methods respectively from the binder resins of Example 4 (ink A) and a commercially available natural-resin acid ester which is modified with a phenol-formaldehyde condensation product (zinc content determined as ZnO: 4.5% by weight, viscosity (25% strength in toluene) at 23° C.: 4.5 mPa.s (ink B)) using red pigment (®Litholrubin, BASF AG), and these concentrates are then adjusted with toluene to a print viscosity of 23 s in the 3 mm flow cup. Ink A then has a pigment content of 8.5% by weight and a resin content of 40% by weight, the corresponding figures for ink B being 8.5 and 32% by weight, respectively.

These inks are used to print highly absorbent paper in the intaglio printing process. The gloss of the prints, which for a good result in terms of printing technology should be as high as possible, is then measured with a Lange laboratory reflectometer at an incident angle of 60°. The gloss of the ink formulated with the novel resin is higher than that of the ink formulated with the comparison resin.

| Ink | A | B |
| --- | --- | --- |
| Gloss [%] | 66 | 58 |

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Priority application, German 195 38 161.0 filed Oct. 13, 1995, in its entirety, is hereby incorporated by reference.

What is claimed is:

1. A resin comprising one or more units of compounds of each of groups A, B, C, and D; and optionally, one or more compounds of each of groups E, F, and G, wherein:

the compounds of group A are selected from the group consisting of natural resins and natural resin acids;

the compounds of the group B are selected from the group consisting of aldehydes and aldehyde acetals;

the compounds of the group C are selected from the group consisting of alcohols having at least two hydroxyl groups;

the compounds of the group D are selected from the group consisting of metal salts;

the compounds of the group E are selected from the group consisting of α,β-ethylenically unsaturated carboxylic acids and their anhydrides;

the compounds of the group F are selected from the group consisting of fatty acids and fatty acid esters; and the compounds of the group G are selected from the group consisting of ethylenically unsaturated hydrocarbon resins, and wherein the resin contains substantially no phenol or phenol-aldehyde condensation products.

2. A resin consisting of one or more units of compounds of each of groups A, B, C, and D; and optionally, one or more compounds of each of groups E, F, and G, wherein:

the compounds of group A are selected from the group consisting of natural resins and natural resin acids;

the compounds of the group B are selected from the group consisting of aldehydes and aldehyde acetals;

the compounds of the group C are selected from the group consisting of alcohols having at least two hydroxyl groups;

the compounds of the group D are selected from the group consisting of metal salts;

the compounds of the group E are selected from the group consisting of α,β-ethylenically unsaturated carboxylic acids and their anhydrides;

the compounds of the group F are selected from the group consisting of fatty acids and fatty acid esters; and the compounds of the group G are selected from the group consisting of ethylenically unsaturated hydrocarbon resins.

3. A resin as claimed in claim 2, consisting of one or more units of compounds of each of the groups A, B, C, D and E.

4. A process for the preparation of a resin which comprises:

(i) reacting one or more compounds of each of the groups A and B, wherein:

the compounds of group A are selected from the group consisting of natural resins and natural resin acids;

the compounds of the group B are selected from the group consisting of aldehydes and aldehyde acetals; and (ii) subsequently reacting the product obtained in (i) with one or more compounds of each of the groups C and D and optionally one or more compounds of each of groups E, F and G, wherein the reaction of subsection (ii) is carried out at a temperature of from 100° to 300° C. with the elimination of water, and wherein:

the compounds of the group C are selected from the group consisting of alcohols having at least two hydroxyl groups;

the compounds of the group D are selected from the group consisting of metal salts;

the compounds of the group E are selected from the group consisting of α,β-ethylenically unsaturated carboxylic acids and their anhydrides;

the compounds of the group F are selected from the group consisting of fatty acids and fatty acid esters; and the compounds of the group G are selected from the group consisting of ethylenically unsaturated hydrocarbon resins, and wherein the resin contains substantially no phenol or phenol-aldehyde condensation products.

5. A resin as claimed in claim 1, produced by a process which comprises:

(i) reacting one or more compounds of each of the groups A and B, wherein:

the compounds of group A are selected from the group consisting of natural resins and natural resin acids;

the compounds of the group B are selected from the group consisting of aldehydes and aldehyde acetals; and (ii) subsequently reacting the product obtained in (i) with one or more compounds of each of the groups C and D and optionally one or more of each of E, F and G, wherein the reaction of subsection (ii) is carried out at a temperature of from 100° to 300° C. with the elimination of water, and wherein:

the compounds of the group C are selected from the group consisting of alcohols having at least two hydroxyl groups;

the compounds of the group D are selected from the group consisting of metal salts;

the compounds of the group E are selected from the group consisting of α,β-ethylenically unsaturated carboxylic acids and their anhydrides;

the compounds of the group F are selected from the group consisting of fatty acids and fatty acid esters;

the compounds of the group G are selected from the group consisting of ethylenically unsaturated hydrocarbon resins, and wherein the resin contains substantially no phenol or phenol-aldehyde condensation products.

6. A resin as claimed in claim 1, further comprising a member selected from:

E) α,β-ethylenically unsaturated carboxylic acids and their anhydrides.

7. A resin as claimed in claim 1, wherein the resin contains no phenol or phenol-aldehyde condensation products.

8. A resin as claimed in claim 1, wherein the metal salts comprise salts of lithium, sodium, potassium, magnesium, calcium, zinc or aluminum in the form of their oxides, hydroxides, carbonates, hydrogen carbonates, acetates, or alcoholates.

9. A process as claimed in claim 4, wherein the mass fractions of components of each group reacted are:

from 30 to 95% of group A), from 1 to 20% of group B), from 0.1 to 20% of group C), from 0.1 to 10% of group D), from 0 to 20% of group E), from 0 to 40% of group F), and from 0 to 70% of group G, all based on the total mass of the components of all groups used in the reaction.

10. A process as claimed in claim 4, wherein the weight ratio of natural resin or natural-resin acid to aldehyde is between 99.9:0.1 and 70:30.

11. A resin as claimed in claim 5, wherein the mass fractions of components of each group reacted are:

from 30 to 95% of group A), from 1 to 20% of group B), from 0.1 to 20% of group C), from 0.1 to 10% of group D), from 0 to 20% of group E), from 0 to 40% of group F), and from 0 to 70% of group G, all based on the total mass of the components of all groups used in the reaction.

12. A resin as claimed in claim 5, wherein the weight ratio of natural resin or natural-resin acid to aldehyde is between 99.9:0.1 and 70:30.

13. A pigment dispersion or pigment concentrate which comprises the resin as claimed in claim 1.

14. A printing ink which comprises the resin as claimed in claim 1.

15. A printing ink for use in intaglio printing of illustrations which comprises the resin as claimed in claim 1 and toluene.

* * * * *